Patented May 16, 1933

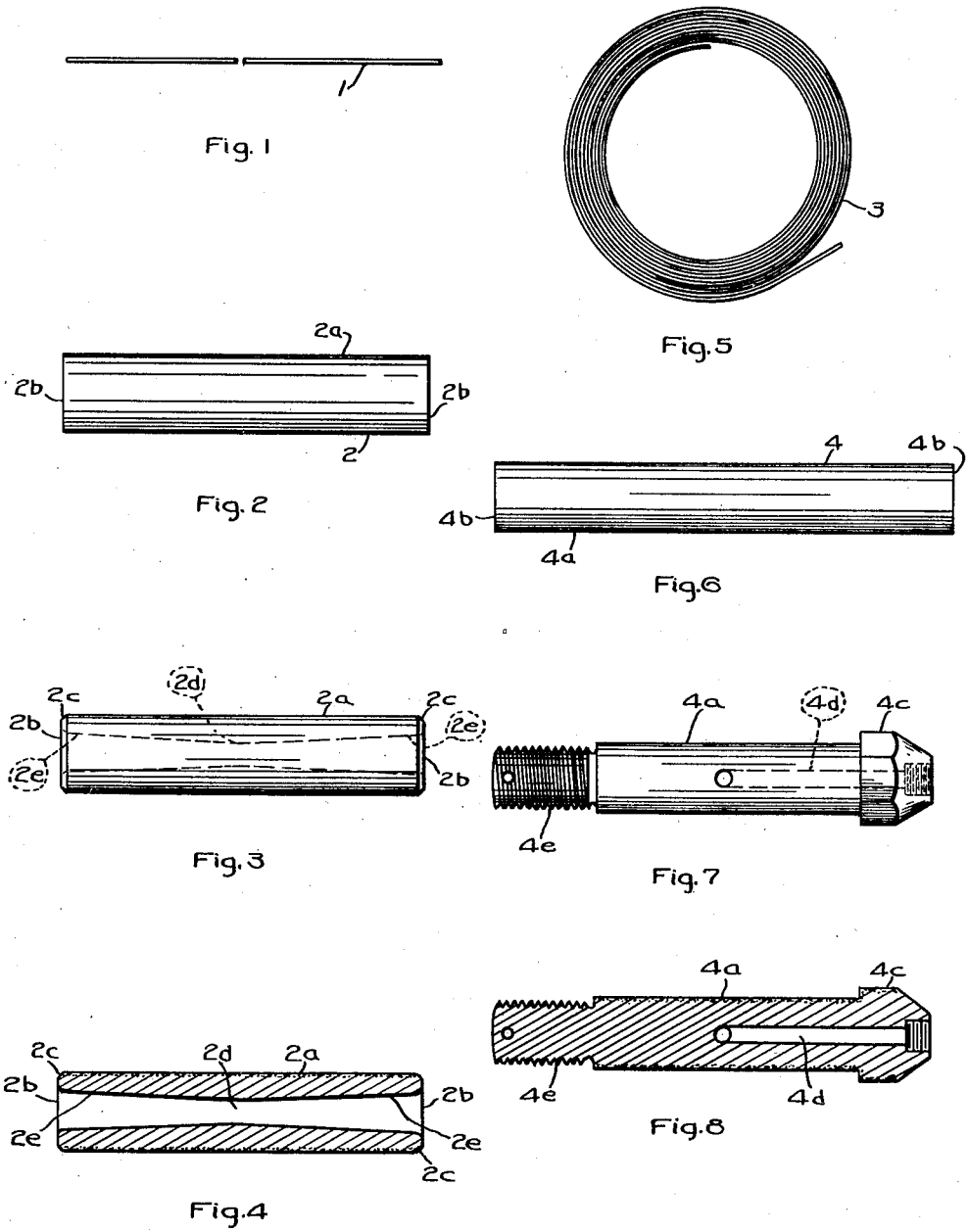

1,909,553

UNITED STATES PATENT OFFICE

NATHAN H. SCHERMER, OF YOUNGSTOWN, AND EDWARD A. GRIFFITHS, OF MASSILLON, OHIO

MANUFACTURE OF CARBURIZED ARTICLES

Application filed July 9, 1930. Serial No. 466,880.

This invention relates to novel methods of manufacturing piston pins, shackle bolts and similar articles from relatively long bars of iron or steel.

Heretofore, it has been the practice in the manufacture of piston pins, to cut a relatively long cold rolled or cold drawn bar of iron or steel into short pieces of the approximate length of the finished piston pin, machine the pins to size, and then carburize the pins. The carburizing of the pins is then a delicate procedure as each pin must be handled separately and carefully packed in the carburizing box. A piston pin of the conventional type is provided with a hole extending axially therethrough and tapering slightly from the ends of the pin to points adjacent the center thereof. The axial hole in a piston pin affords maximum strength against shearing and bending stresses with a minimum of weight and provides an oil chamber for facilitating feeding of oil to the connecting rod bearing. In addition, the ends of the pin are slightly chamfered to facilitate assembly of the pin with the piston and connecting rod.

In the manufacture of pins of this type, provision must be made to prevent carburization of the metal in the hole, and this is usually accomplished by plugging or sealing the hole at both ends with plastic fireclay or a similar substance. Unless this precaution is taken, carburization will take place on the wall of the hole, thereby reducing the cross-section of tough or uncarburized core metal, and introducing the danger of fractures developing in the pin.

To avoid these dangers, some manufacturers have gone to the expense of cutting the cold rolled or cold drawn bar into short pieces of the approximate length of the finished piston pin, carburizing the solid pins so formed, and then drilling the holes in the pins after carburizing the solid pins. This method has the disadvantage that the solid pins, owing to the fact that they are machined and drilled after the carburizing operation, must be cooled more slowly than hollow pins, to insure a soft surface and core for the machining and drilling operations. Furthermore, the solid pins must be drilled by setting each pin by hand in a drill press, instead of in an automatic machine, with the result that the costs of manufacture are increased.

After the pins have been carburized, they are hardened by heating them above the upper critical point of the carburized case and then quenching them. Owing to the numerous handling operations which the pins are obliged to undergo, their surfaces are apt to be scratched or otherwise marked, and for this reason, it is necessary to grind or lap the surfaces thereof. In grinding or lapping the surfaces of the pins, extreme caution must be exercised not to penetrate too deeply into the carburized case, else the advantages of the carburized case will be lost.

The present invention has for its primary object a method of manufacturing piston pins which substantially eliminates the aforesaid dangers and difficulties, reduces the number of handling operations, materially lowers the costs of manufacture and improves the finish and quality of the piston pins.

In accordance with the invention, we take hot rolled bars of iron or steel in lengths of six feet or more before they have been machined or otherwise treated, and straighten them by well-known methods which need not here be described. We then pass these bars through a centerless grinder or the like, which removes sufficient metal from the bars to insure a sound surface free from defects. In practice, the amount of metal removed will vary from .010" to .030". After the bars have been thus ground, we carburize them by any one of the usual carburizing methods, but preferably by packing them in a carburizing box in which each bar is completely surrounded by the carburizing material, which may be a mixture of charcoal, coke, and an energizer, such as barium carbonate, sodium carbonate, calcium carbonate or charred leather. After a carburized case of the desired thickness has been formed, the bars are permitted to cool slowly in order that they may be rendered easily machinable.

The bars are then placed in an automatic machine of the type used for manufacturing piston pins. In this machine, the pins are successively cut from the end of the bar, the ends properly chamfered and the holes drilled and reamed to proper size.

By thus doing away with the necessity of subsequently carburizing the individual pins, a number of handling operations, including hand drilling, is eliminated and the pins assured of a soft core. The chamfering of the ends of the pin is also facilitated by virtue of the fact that the ends of the pin are left soft and uncarburized, and when the pins are subsequently hardened, they will have a desired soft corner.

Moreover, owing to the fact that the pins are handled to a minimum extent, their surfaces are freer from tool marks, scratches, etc., and the depth to which the hardened pins must be ground or lapped is consequently less than in the usual methods of manufacturing piston pins. In this manner, it becomes possible to start with a hot rolled bar, ground to within a few thousandths of an inch (not more than .005" or .006") of the finished size of the piston pins, and to maintain this size throughout the various operations.

A modification of the aforesaid process is also adapted for use in the manufacture of cold-headed shackle bolts and other articles made in cold-heading machines. In this process, carburized wire in coils of any desired length are passed through an automatic machine, in which short pieces are cut off the coil and these pieces cold-headed, formed with an axial hole extending partly therethrough (for oiling), and exteriorly threaded at one end. In manufacturing shackle bolts in this manner, the distortion of the threads which would take place if the bolts were carburized after cold-heading, is avoided.

In the accompanying drawing, which forms a part of the specification, we have illustrated various steps in the methods of manufacturing piston pins and shackle bolts in accordance with the present invention.

In the drawing,

Fig. 1 shows a carburized hot rolled round bar of iron or steel of a length suitable for use in an automatic machine of the type used for manufacturing piston pins;

Fig. 2 is an enlarged view of a short length of the bar shown in Fig. 1, which has been cut off in the automatic machine;

Fig. 3 is a view of a piston pin made from the piece shown in Fig. 2;

Fig. 4 is a longitudinal cross-section through the piston pin shown in Fig. 3;

Fig. 5 shows a carburized coil of wire of a length suitable for use in an automatic machine of the type used for manufacturing shackle bolts;

Fig. 6 is an enlarged view of a short length of the coil shown in Fig. 5, which has been cut off in the automatic machine;

Fig. 7 is a view of a shackle bolt formed from the piece shown in Fig. 6, and

Fig. 8 is a longitudinal cross-section through the shackle bolt shown in Fig. 7.

Referring to Figs. 1 to 4 of the drawing, 1 is a carburized hot rolled bar of a length preferably in excess of six feet. This bar is placed in an automatic machine of the type used for manufacturing piston pins, and short pieces 2 successively cut from one end of the bar. These pieces have a carburized surface 2a and uncarburized ends 2b. The ends of each piece 2 are chamfered as at 2c, and the piece is drilled and reamed to provide an axial hole 2d, the ends of which are tapered, as indicated at 2e. After the piston pin is thus formed, it is hardened by heating it above the upper critical point of the carburized case and quenching it. The surfaces of the hardened pin are then ground or lapped to remove scratches or other marks. In this grinding or lapping operation, care is exercised not to penetrate too deeply into the carburized case.

Referring to Figs. 5 to 8 of the drawing, 3 is a carburized coil of a length suitable for use in an automatic machine of the type used for manufacturing shackle bolts. This coil is placed in the automatic machine and short pieces 4 successively cut from one end of the coil. These pieces have a carburized surface 4a and uncarburized ends 4b. One end of each piece is cold-headed to provide a head 4c, and this end is also drilled to provide an axial hole 4d. The piece is also exteriorly threaded as at 4e. After the shackle bolt is thus formed, it is hardened by heating it above the upper critical point of the carburized case and quenching it. In manufacturing shackle bolts in this manner, the distortion of the threads which would take place if the bolts were carburized after cold-heading, is avoided.

It is thus seen that the present invention does away with the necessity of individually handling and carburizing small parts in the manufacture of piston pins and shackle bolts and insures a soft core in machined parts. The bars, since they are ground before carburizing, are held closer to size, and after the machining and hardening operations, there is less grinding off and lapping to do. The distortion that might take place in carburizing after machining is also avoided.

Without further description, it is thought that the features and advantages of the invention will be readily apparent to those skilled in the art, and it will of course be understood that changes in the minor details of the process may be resorted to without departing from the scope of the appended claims.

We claim:

1. The method of manufacturing articles which are to be provided with axially extending holes therein, which includes carburizing relatively long bars of iron or steel, cutting the bars into short pieces of the approximate length of the finished article, and then forming axially extending holes in said pieces.

2. The method of manufacturing piston pins which includes carburizing relatively long bars of iron or steel, cutting the bars into short pieces of the approximate length of the finished piston pin, and then forming axially extending holes in said pieces.

3. The method of manufacturing piston pins which includes carburizing relatively long bars of iron or steel, cutting the bars into short pieces of the approximate length of the finished piston pin, and then drilling holes axially therethrough.

4. The method of manufacturing piston pins which includes straightening relatively long bars of hot rolled iron or steel, grinding the surface of the straightened bars, carburizing the bars, cutting the bars into short pieces of the approximate length of the finished piston pin, and then forming axially extending holes in said pieces.

5. The method of manufacturing piston pins which includes straightening relatively long bars of hot rolled iron or steel, grinding the bars to the approximate diameter of the finished piston pin, carburizing the bars, cutting the bars into short pieces of the approximate length of the finished piston pin, and then forming axially extending holes in said pieces.

6. The method of manufacturing shackle bolts, which consists in carburizing relatively long bars of iron or steel, cutting the bars into short pieces, cold-heading one end of each piece, drilling an axially extending hole in the cold-headed end of each piece, and exteriorly threading the opposite end of each piece.

7. The method of manufacturing shackle bolts which consists in carburizing a coil of iron or steel wire, cutting short pieces from the end of said carburized coil, cold-heading one end of each piece, drilling an axially extending hole in the cold-headed end of each piece, and exteriorly threading the opposite end of each piece.

8. The method of manufacturing articles which are to be provided with axially extending holes therein, which includes carburizing relatively long bars of iron or steel, cutting the bars into short pieces of the approximate length of the finished articles, then forming axially extending holes in said pieces, and then hardening each piece by heating it above the upper critical point of the carburized case and quenching it.

9. The method of manufacturing piston pins which includes carburizing relatively long bars of iron or steel, cutting the bars into short pieces of the approximate length of the finished piston pin, then forming axially extending holes in said pieces, and then hardening each piece by heating it above the upper critical point of the carburized case and quenching it.

10. The method of manufacturing piston pins which includes carburizing relatively long bars of iron or steel, cutting the bars into short pieces of the approximate length of the finished piston pin, then drilling holes axially therethrough, and then hardening each piece by heating it above the upper critical point of the carburized case and quenching it.

11. The method of manufacturing piston pins which includes straightening relatively long bars of hot rolled iron or steel, grinding the surface of the straightened bars, carburizing the bars, cutting the bars into short pieces of the approximate length of the finished piston pin, then forming axially extending holes in said pieces, and then hardening each piece by heating it above the upper critical point of the carburized case and quenching it.

12. The method of manufacturing piston pins which includes straightening relatively long bars of hot rolled iron or steel, grinding the bars to the approximate diameter of the finished piston pin, carburizing the bars, cutting the bars into short pieces of the approximate length of the finished piston pin, then forming axially extending holes in said pieces, and then hardening each piece by heating it above the upper critical point of the carburized case and quenching it.

13. The method of manufacturing shackle bolts which consists in carburizing relatively long bars of iron or steel, cutting the bars into short pieces, cold-heading one end of each piece, drilling an axially extending hole in the cold-headed end of each piece, exteriorly threading the opposite end of each piece, and then hardening each piece by heating it above the upper critical point of the carburized case and quenching it.

14. The method of manufacturing shackle bolts which consists in carburizing a coil of iron or steel wire, cutting short pieces from the end of said carburized coil, cold-heading one end of each piece, drilling an axially extending hole in the cold-headed end of each piece, exteriorly threading the opposite end of each piece, and then hardening each piece by heating it above the upper critical point of the carburized case and quenching it.

In testimony whereof we affix our signatures.

NATHAN H. SCHERMER.
EDWARD A. GRIFFITHS.